United States Patent
Barr et al.

(10) Patent No.: US 9,708,915 B2
(45) Date of Patent: Jul. 18, 2017

(54) HOT GAS COMPONENTS WITH COMPOUND ANGLED COOLING FEATURES AND METHODS OF MANUFACTURE

(71) Applicant: General Electric Company, Schenectady, NY (US)

(72) Inventors: Brian Chandler Barr, Niskayuna, NY (US); Roberto Claretti, Evandale, OH (US)

(73) Assignee: General Electric Company, Niskayuna, NY (US)

( * ) Notice: Subject to any disclaimer, the term of this patent is extended or adjusted under 35 U.S.C. 154(b) by 527 days.

(21) Appl. No.: 14/168,176

(22) Filed: Jan. 30, 2014

(65) Prior Publication Data

US 2016/0153281 A1  Jun. 2, 2016

(51) Int. Cl.
*F01D 5/18* (2006.01)
*F23R 3/00* (2006.01)
(Continued)

(52) U.S. Cl.
CPC ............ *F01D 5/186* (2013.01); *F01D 9/065* (2013.01); *F01D 25/12* (2013.01); *F23R 3/002* (2013.01);
(Continued)

(58) Field of Classification Search
CPC .......... F01D 5/186; F01D 25/12; F01D 9/065; F23R 3/06; F23R 3/002;
(Continued)

(56) References Cited

U.S. PATENT DOCUMENTS

| 4,770,608 A | 9/1988 | Anderson et al. |
|---|---|---|
| 5,326,224 A | 7/1994 | Lee et al. |
| (Continued) | | |

FOREIGN PATENT DOCUMENTS

| JP | 04358701 A | 12/1992 |
|---|---|---|
| JP | 07279612 A | 10/1995 |
| (Continued) | | |

OTHER PUBLICATIONS

Ligrani et al., "Film Cooling from Two Staggered Rows of Compound Angle Holes at High Blowing Ratios", International Journal of Rotating Machinery, vol. No. 2, Issue No. 3, pp. 201-208, 1996.
(Continued)

*Primary Examiner* — Ryan J Walters
(74) *Attorney, Agent, or Firm* — Nitin N. Joshi (57) ABSTRACT

A hot gas path component including a substrate having an outer surface exposed to a stream of hot gases and an inner surface exposed to a cooling flow. One or more pair of cooling supply inlets is formed at the inner surface of the substrate for receiving the cooling air flow. One or more pair of cooling supply outlets is formed at the outer surface of the substrate for discharging the cooling air flow. A cooling flow channel extends through the substrate and between each of cooling supply inlets and the cooling supply outlets for permitting passage of the cooling air flow. Each pair of the one or more pair of cooling supply outlets is configured having complementary compound angles α and β, where $\alpha_1$ and $\alpha_2$ are injection angle components of the cooling flow discharged from each pair of the one or more pair of cooling supply outlets and $\beta_1$ and $\beta_2$ are compound transverse angle components of the cooling flow discharged from each pair of the one or more pair of cooling supply outlets, and wherein the transverse angle components $\beta_1$ and $\beta_2$ are of the same sign.

16 Claims, 4 Drawing Sheets

(51) Int. Cl.
*F23R 3/06* (2006.01)
*F01D 9/06* (2006.01)
*F01D 25/12* (2006.01)

(52) U.S. Cl.
CPC .......... *F23R 3/06* (2013.01); *F05D 2250/311* (2013.01); *F05D 2250/312* (2013.01); *F05D 2250/314* (2013.01); *F05D 2250/38* (2013.01); *F05D 2260/202* (2013.01); *F23R 2900/03042* (2013.01); *Y02T 50/672* (2013.01); *Y02T 50/673* (2013.01); *Y02T 50/676* (2013.01)

(58) Field of Classification Search
CPC ..... F23R 2900/03042; F05D 2250/311; F05D 2250/314; F05D 2250/312; F05D 2260/202; F05D 2250/38
See application file for complete search history.

(56) References Cited

U.S. PATENT DOCUMENTS

| | | | |
|---|---|---|---|
| 5,342,172 | A | 8/1994 | Coudray et al. |
| 5,496,151 | A | 3/1996 | Coudray et al. |
| 5,577,889 | A | 11/1996 | Terazaki et al. |
| 5,779,438 | A | 7/1998 | Wilfert |
| 7,186,085 | B2 | 3/2007 | Lee |
| 7,223,072 | B2 | 5/2007 | Riahi et al. |
| 7,328,580 | B2 | 2/2008 | Lee et al. |
| 7,597,540 | B1 | 10/2009 | Liang |
| 7,682,132 | B2 | 3/2010 | Sugimoto et al. |
| 7,878,761 | B1 | 2/2011 | Liang |
| 7,997,867 | B1 | 8/2011 | Shih et al. |
| 8,066,484 | B1 | 11/2011 | Liang |
| 8,317,473 | B1 | 11/2012 | Liang |
| 2005/0261675 | A1 | 11/2005 | Shibata |
| 2006/0002796 | A1 | 1/2006 | Bolms et al. |
| 2013/0175015 | A1 | 7/2013 | Tanaka et al. |
| 2013/0323080 | A1 | 12/2013 | Martin et al. |

FOREIGN PATENT DOCUMENTS

| | | |
|---|---|---|
| JP | 1073004 A | 3/1998 |
| JP | 2000230402 A | 8/2000 |

OTHER PUBLICATIONS

Ahn et al., "Film Cooling From Two Rows of Holes with Opposite Orientation Angles: Injectant Behavior and Adiabatic Film Cooling Effectiveness", International Journal of Heat and Fluid Flow, vol. No. 24, Issue No. 1, pp. 91-99, Feb. 2003.

Unofficial English Translation of Japanese Office Action issued in connection with corresponding JP Application No. 2015014943 on Mar. 1, 2016.

Unofficial English Translation of Chinese Office Action issued in connection with corresponding CN Application No. 201510048539.9 on Mar. 2, 2016.

Anonymous, "Angle", Wikipedia—the free Encyclopedia, URL:https://en.wikipedia.org/w/index.php?title=special:Book&bookcmd=download&collection_id=1a7d624ce89499eb95dcb46d7517a81d9c48c0d7&writer=rdf2latex&return_to=Angle, Retrieved on Nov. 5, 2015, pp. 1-11, Jan. 29, 2014.

European Search Report and Opinion issued in connection with corresponding EP Application No. 15152876.7 on Nov. 13, 2015.

B. Sen et al., "Film Cooling With Compound Angle Holes: Heat Transfer", Journal of Turbomachinery, ASME Digital Collection, Oct. 1, 1996, vol. 118 Issue 4, 7 pages.

Choi et al., "Analysis and Optimization of Double-Jet Film-Cooling Holes", Journal of Thermophysics and Heat Transfer, ARC, 2013, vol. 27, No. 2, pp. 246-254.

HOT GAS COMPONENTS WITH COMPOUND ANGLED COOLING FEATURES AND METHODS OF MANUFACTURE

BACKGROUND

The disclosure relates generally to gas turbine engines, and, more specifically, to film cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve an acceptably long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid, such as a relatively cool supply of compressed air, which may be supplied by the compressor of the turbine engine, may be provided to the serpentines from a plenum, and the cooling fluid may flow through the passages, exiting through one or more small holes formed on the wall surface, cooling the hot gas path component substrate and any associated coatings. However, this cooling strategy typically results in comparatively inefficient heat transfer and non-uniform component temperature profiles.

As indicated, in some instances, the supply of compressed air is released through small holes on the surface of the airfoils. Released in this manner, the supply of air forms a thin layer or film of relatively cool air at the surface of the airfoil, which both cools and insulates the part from the higher temperatures that surround it. This type of cooling is commonly referred to as "film cooling". Film cooling involves a complex three dimensional flow. Interactions between a freestream and the cooling holes or jets, influence the overall film effectiveness. However, this type of film cooling comes at an expense. The release of the compressed air in this manner over the surface of the airfoil, lowers the aero-efficiency of the engine. In addition, the cooling fluid exiting the cooling holes into the freestream passage of high-temperature gas is easily separated from the wall surface, so that the efficiency of the film cooling is low. Current design technology is focused on shaped cooling holes, which use the geometry of the shaped hole to slow down and diffuse the film cooling leading to higher film effectiveness, yet can be costly to manufacture. As a result, there is an ongoing need for improved cooling strategies, including improved film cooling, for turbine airfoils.

It would therefore be desirable to provide a hot gas path component and method of forming cooling structures in the hot gas path component that provides for a more efficient and flexible cooling design that does not suffer from the above drawbacks.

BRIEF DESCRIPTION

These and other shortcomings of the prior art are addressed by the present disclosure, which provides a component with compound angled cooling features and method of manufacture.

One aspect of the present disclosure resides in a hot gas path component. The hot gas path component including a substrate, having an outer surface exposed to a stream of hot gases and an inner surface exposed to a cooling flow, the inner surface defining at least one interior space and one or more pair of cooling supply inlets formed at the inner surface of the substrate for receiving the cooling air flow, one or more pair of cooling supply outlets formed at the outer surface of the substrate for discharging the cooling air flow, and a cooling flow channel extending through said substrate and between each of the cooling supply inlets and cooling supply outlets for permitting passage of the cooling air flow from the cooling supply inlets to the cooling supply outlets. Each pair of the one or more pair of cooling supply outlets are configured having complementary compound angles $\alpha$ and $\beta$, where $\alpha_1$ and $\alpha_2$ are injection angle components of the cooling flow discharged from each pair of the one or more pair of cooling supply outlets measured relative to the outer and inner surfaces of the substrate and $\beta_1$ and $\beta_2$ are compound transverse angle components of the cooling flow discharged from each pair of the one or more pair of cooling supply outlets on a plane along the outer surface and relative to a z-axis aligned relative to the flow direction of the external hot gases, and wherein the transverse angle components $\beta_1$ and $\beta_2$ are of the same sign.

Another aspect of the present disclosure resides in a wall of a hot gas path component. The wall including opposite inner and outer surfaces having two or more compound angled film cooling holes extending longitudinally therethrough and between two or more cooling supply inlets formed at the inner surface for receiving a cooling flow and two or more cooling supply outlets formed at the outer surface for discharging the cooling flow, each of the two or more cooling supply inlets in fluid communication with one of the two or more cooling supply outlets via a cooling flow channel. Each of the two or more compound angled film cooling holes is configured in a pair having complementary compound angles $\alpha$ and $\beta$, where $\alpha_1$ and $\alpha_2$ are injection angle components of the cooling flow discharged from a pair of cooling supply outlets measured relative to the outer and inner surfaces of the substrate and $\beta_1$ and $\beta_2$ are compound transverse angle components of the cooling flow discharged from the pair of cooling supply outlets on a plane along the outer surface and relative to a z-axis aligned relative to a flow direction of external hot gases, and wherein the transverse angle components $\beta_1$ and $\beta_2$ are of the same sign.

Various refinements of the features noted above exist in relation to the various aspects of the present disclosure.

Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the cooling outlet" may include one or more cooling outlets, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
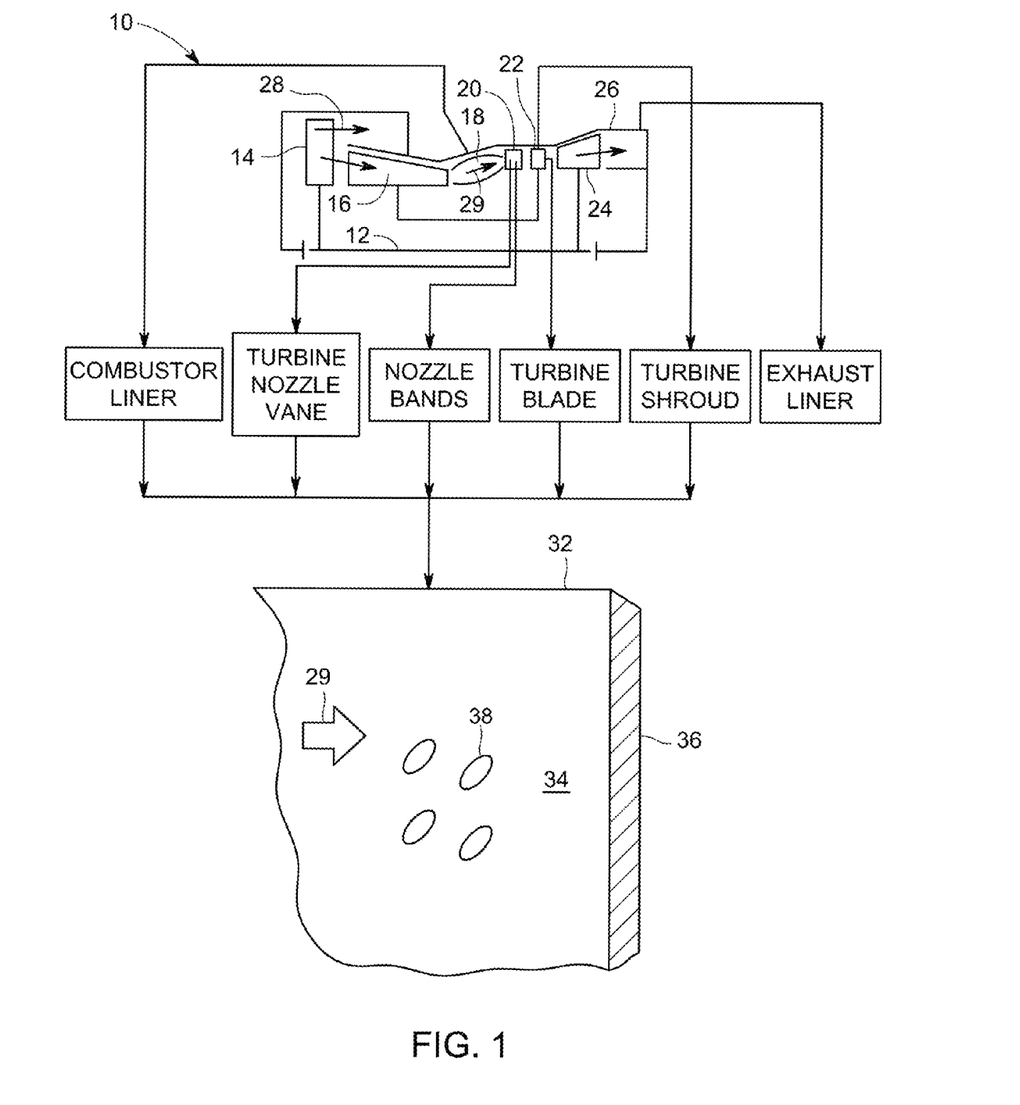
FIG. 1 is a schematic illustration of a gas turbine system having various components, each including one or more compound cooling features, according to one or more embodiments shown or described herein.

Illustrated schematically in FIG. 1 is a gas turbine engine 10 which is axisymmetrical about a longitudinal or axial centerline axis 12. The engine includes in serial flow communication a fan 14, multistage axial compressor 16, and an annular combustor 18 followed in turn by a high pressure turbine (HPT) and a low pressure turbine (LPT).

The HPT includes a turbine nozzle 20 having a row of hollow stator vanes supported in inner and outer nozzle bands. A first stage turbine 22 follows the first stage turbine nozzle and includes a row of hollow rotor blades extending radially outwardly from a supporting rotor disk and surrounded by an annular turbine shroud. A low pressure turbine (LPT) 24 follows the high pressure turbine and includes additional nozzles and rotor blades which may or may not include internal cooling circuits depending upon the engine design. An exhaust liner 26 follows the low pressure turbine.

During operation, ambient air 28 is pressurized by the fan 14, and lower portion of which enters the compressor 16 for additional pressurization, while the outer portion is discharged from a fan outlet for providing propulsion thrust in a turbofan engine application. The air pressurized in the compressor is mixed with fuel in the combustor for generating hot combustion gases 29. The combustion gases flow through the various turbine blade stages which extract energy therefrom for powering the compressor and fan during operation.

The gas turbine engine 10 may include a number of hot gas path components. A hot gas path component is any component of the engine 10 that is at least partially exposed to a flow of high temperature gas through the engine 10. For example, bucket assemblies (also known as blades or blade assemblies), nozzle assemblies (also known as vanes or vane assemblies), shroud assemblies, transition pieces, retaining rings, and turbine exhaust components are all hot gas path components. However, it should be understood that the hot gas path component of the present disclosure is not limited to the above examples, but may be any component that is at least partially exposed to a flow of high temperature gas. Further, it should be understood that the hot gas path component of the present disclosure is not limited to components in gas turbine engine 10, but may be any piece of machinery or component thereof that may be exposed to high temperature flows. When a hot gas path component is exposed to a hot gas flow, the hot gas path component is heated by the hot gas flow and may reach a temperature at which the hot gas path component is substantially degraded or fails. Thus, in order to allow engine 10 to operate with hot gas flow at a high temperature, as required to achieve the desired efficiency, performance and/or life of the engine 10, a cooling system for the hot gas path component is needed.

Any one or more of the various engine components disclosed above which are subject to heating from the hot combustion gases 29 may be suitably cooled by bleeding a portion of the pressurized air from the compressor 16 during operation. Accordingly, the exemplary turbofan engine 10 illustrated in FIG. 1 may have any conventional configuration and operation, but is modified as a herein described for introducing improved film cooling.

In this regard, any one of those heated components which require cooling will include a thin metal wall, also referred to herein as a substrate, 32. The substrate 32 is typically formed of a conventional superalloy metal, such as a cobalt-based material, having high strength at the elevated temperatures experienced in operation of the gas turbine engine due to heating from the hot combustion gases 29. These hot components are typically hollow and provided with suitable cooling circuits therein that receive the pressurized cooling air flow from the compressor which is used as a coolant in reducing their temperatures during operation.

The a portion of the flowpath component wall, or substrate, 32 is illustrated in part in plan view in FIG. 1, and includes opposite outer and inner wall surfaces 34, 36 and may be in the form of the outer or inner combustor liners, the turbine nozzle vanes, the turbine nozzle bands, the turbine rotor blades, the turbine shroud, or the exhaust liner, for typical examples, which utilize various forms of film cooling holes therein. The inner or inboard surface of the substrate forms the outer boundary of a suitable cooling circuit provided in the component which receives air bled from the compressor in any conventional manner. The outer surface is exposed to the hot combustion gases 29 during operation and requires suitable film cooling protection.

FIGS. 1-6 illustrate a new form of film cooling hole 38 arranged in a suitable row along the applicable span of the component 30. The film cooling holes 38 are uniquely identified by their compound angled configurations of the same sign.

In general, the cooling system of the present disclosure includes a series of small cooling channels, or microchannels, formed in the thin metal wall, also referred known as the substrate of the hot gas path component. The hot gas path component may include one or more micro-channels, also referred to herein as cooling flow channels. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.1 mm to 0.5 mm. A cooling fluid may be provided to the channels from a plenum, and the cooling fluid may flow through the channels, cooling the hot gas path component. In this way, the coolant flow is first used for impingement cooling an inner surface of the hot gas path component and then flows through the network of flow channels (described presently) prior to discharge from the one or more cooling supply outlets (described presently) to provide film cooling.

Figure 2:
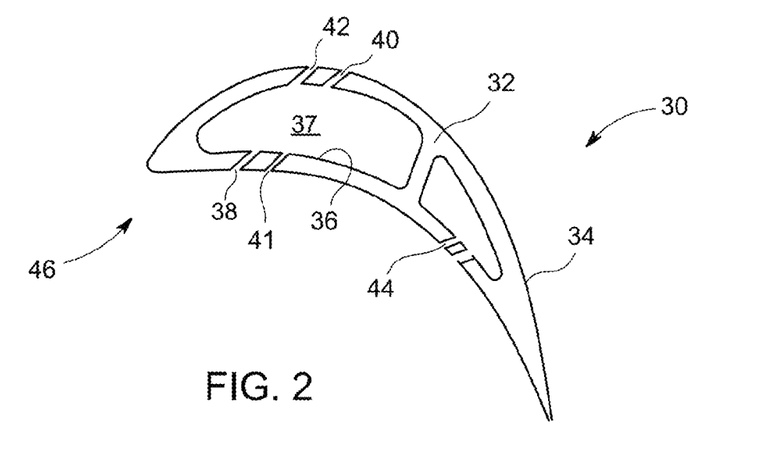
FIG. 2 is a schematic cross-section of an example airfoil configuration including one or more compound cooling features, according to one or more embodiments shown or described herein.

Referring now to FIG. 2, illustrated is an example of a hot gas path component 30 having an airfoil configuration. As indicated, the component 30 comprises a substrate 32 with an outer surface 34 and an inner surface 36. In an embodiment, one or more protective layers may be disposed on the outer surface 34 of the substrate 32. Defined within the substrate 32, and any optional protective layers if present, are portions of one or more cooling flow channels 40. The inner surface 36 of the substrate 32 defines at least one hollow, interior space 37. In an alternate embodiment, in lieu of a hollow interior space, the hot gas path component 30 may include a supply cavity. As indicated, one or more coatings may be disposed over at least a portion of the outer surface 34 of the substrate 32, having defined therein, portions of the one or more cooling flow channels 40 and film cooling holes 38. Accordingly, each of the one or more cooling flow channels 40 extends within the substrate 32 and is in fluidic communication with the at least one hollow, interior space 37 via one or more cooling supply inlets 42 formed in the substrate 32 at the inner surface 36 to the outer surface 34, via one or more cooling supply outlets 44 defining the film cooling holes 38 and an overall cooling network 46.

In an embodiment, the cooling supply inlets 42 and the cooling supply outlets 44 are configured as discrete openings and do not run the length of the respective cooling flow channels 40. As described below, the compound angled cooling features disclosed create a three-dimensional finished component 30, and more particularly the airfoil, including one or more cooling flow channels 40 and film cooling holes 38, wherein the one or more cooling flow channels 40 and the film cooling holes 38 define the cooling network 46 for cooling the component 30. The method may result in a component 30 that includes near transpiration cooling without the necessity of using porous materials of diminished strength.

As previously indicated, an exemplary embodiment fabricated as disclosed herein, is a gas turbine airfoil, including an interior hollow passageway in fluidic communication with one or more cooling flow channels formed within the substrate.

FIGS. 3-6 illustrate a portion of a hot gas path component, such as the hot gas path component 30 of FIG. 2. In each of the illustrated embodiments, one or more cooling supply inlets 42, one or more cooling supply outlets 44 and one or more cooling flow channels 40 are illustrated as formed in the substrate 32 and extending from the inner surface 36 to the outer surface 34 and having complementary compound angle geometry between pairs of film cooling holes, and more particularly the cooling supply outlets 44 as described presently.

Figure 3:
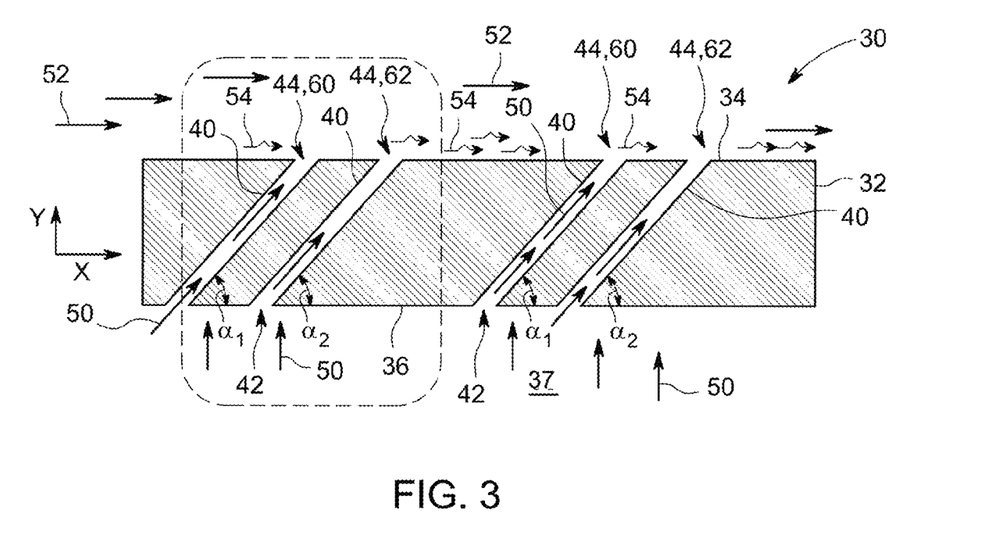
FIG. 3 schematically depicts, in a cross-sectional side view, example compound cooling features, according to one or more embodiments shown or described herein.
Figure 4:
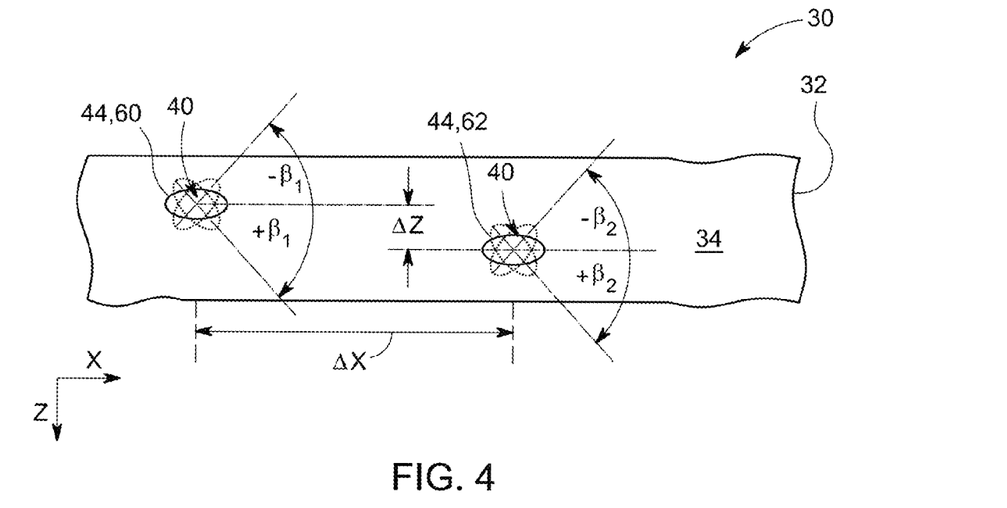
FIG. 4 schematically depicts, in a cross-sectional plan view as indicated by dashed line in FIG. 3, example compound cooling features, according to one or more embodiments shown or described herein.

Referring more specifically to FIGS. 3 and 4, illustrated is an embodiment of a portion of the hot gas path component 30, including a network or pattern of cooling flow channels 40, cooling supply inlets 42 and cooling supply outlets 44. In an embodiment, the network or pattern of cooling flow channels 40 is comprised of a plurality of cooling flow channels 40 for a carrying a cooling flow 50, and more specifically a supply of compressed air, therein. The cooling flow 50 is discharged through the small cooling supply outlets 44 on the outer surface 34 of the hot gas path component 30. Released in this manner, the supply of air, and more particularly the cooling flow 50, forms a thin layer or film 54 of relatively cool air proximate the outer surface 34 of the hot gas path component 30, which both cools and insulates the hot gas path component 30 from the higher temperatures that surround it. As previously indicated, interactions between a freestream of hot gases 52 and the cooling supply outlets 44 influence the overall effectiveness of the film 54 of relatively cool air.

To enhance the aerodynamics of the hot gas path component 30 and effectiveness of the film 54, each of the cooling flow channels 40 and its respective cooling supply inlet 42 and cooling supply outlet 44 is configured to include numerous design variables. The design variables of importance during the design and configuration of each of the cooling flow channels 40 include the angle of injection of the cooling supply outlet 44 of each cooling flow channel 40, a compound angle for each of the cooling flow channels 40, in addition to the streamwise and spanwise location of a downstream supply outlet 44 with respect to a fixed upstream supply outlet 44 while mass flow is held constant. As used herein, $\alpha_1$=injection angle for upstream hole, $\alpha_2$=injection angle for downstream hole, $\beta_1$=compound angle for upstream hole and $\beta_2$=compound angle for downstream hole.

As best illustrated in FIGS. 3 and 4, the cooling supply outlets 44 are configured in pairs with a complementary arrangement of compound angled cooling supply outlets 44 resulting in an increase in film effectiveness. More particularly, in the disclosed configuration, an upstream cooling supply outlet 60 and a downstream cooling supply outlet 62 are included in complementary paired arrangement. In an embodiment, the cooling supply outlets 60, 62 within each pair of cooling supply outlets 44, are configured in close proximity to each other, and more particularly, wherein each of the upstream cooling supply outlets 60 has a hole diameter D1 and each of the downstream cooling supply outlets 62 has a hole diameter D2. In an embodiment, D1 and D2 are equal. In an alternate embodiment, D1 and D2 are not equal. In addition, the downstream supply outlet 62 is configured based on the upstream supply outlet 60 with a streamwise spacing of $\Delta X$ and a lateral spacing of $\Delta Z$ between the upstream cooling supply outlet 60 and the downstream cooling supply outlet 62 within each pair, where a ratio of $\Delta X/D$ is in a range of 2-10 and a ratio of $\Delta Z/D$ is in a range of plus or minus one half the ratio of a pitchwise spacing (P) between the downstream cooling supply outlet 62 of each pair of cooling supply outlets 44 to an upstream cooling supply outlet 60 of an adjacent pair of cooling supply outlets 44, to the hole diameter D ($\pm\frac{1}{2}*P/D$), where P=pitchwise spacing and D=diameter of the holes, in the presence of two or more pairs of cooling supply outlets 44, and wherein D is equal to the larger of D1 and D2 when D1 and D2 are not equal.

In an embodiment, the downstream supply outlet 62 is configured approximately two hole diameters in a downstream direction "X" from the upstream supply outlet 60, and approximately one hole diameter in a pitchwise direction "Z" from the upstream supply outlet 60. In addition, as best illustrated in FIG. 3, each of the cooling supply outlets 44 is configured having an injection angle $\alpha$ relative to the outer and inner surfaces 34, 36 of the substrate 32.

The incidence angle of each of the cooling flow channels 40, and more specifically each of the cooling supply outlets 60, 62 with respect to the surfaces 34 and 36 is $\alpha_1$ for the upstream supply outlet 60 and $\alpha_2$ for the downstream supply outlet 62 and set independently. In an embodiment, the injection angle components $\alpha_1$ and $\alpha_2$ are in a range of 10° to 90° relative to one of the inner surface 34 or the outer surface 36. The compound transverse angles of the upstream supply outlet 60 and the downstream supply outlet 62 are set independent from one another, having the same sign, and thus oriented in the same direction. More specifically, the compound angles of the upstream supply outlet 60 and the downstream supply outlet 62 are set with $\beta_1$ being the compound transverse angle of the upstream supply outlet 60 and $\beta_2$ being the compound transverse angle of the downstream supply outlet 62, having the same sign. In an embodiment, the transverse angle components $\beta_1$ and $\beta_2$ are in a range of −90° to 90° relative to the x-axis. A positive value for $\beta$ means the outlet is oriented towards the right of the domain (positive z). A negative value for $\beta$ means the outlet is oriented towards the left of the domain (negative z). As previously indicated, in both instances, the outlets are oriented in the same direction.

FIG. 4 illustrates an enlarged top view of the cooling supply outlet configuration, as indicated in FIG. 3 by dotted line, and more particularly the upstream supply outlet 60 and the downstream supply outlet 62 configured wherein $\beta_1$ and $\beta_2$ are equal and set at an angle zero relative to Z. Indicated by dotted line in FIG. 4 are additional complementary angled configurations for the upstream supply outlet 60 and the downstream supply outlet 62 configured wherein $\beta_1$ and $\beta_2$ are not equal to zero, yet substantially equal and having the same sign. As illustrated, each pair of the pair of cooling supply outlets 44 are configured having complementary compound angles $\alpha$ and $\beta$, where $\alpha_1$ and $\alpha_2$ are injection angle components of the cooling flow 50 discharged from the pair of cooling supply outlets 40 measured relative to the outer and inner surfaces 34, 36 of the substrate 32 and $\beta_1$ and $\beta_2$ are compound transverse angle components of the cooling flow 50 discharged from the pair of cooling supply outlets 40 on a plane along the outer surface 34 and relative to a z-axis aligned relative to the flow direction of the freestream of hot gases 52, and wherein the transverse angle components $\beta_1$ and $\beta_2$ are of the same sign such that the upstream supply outlet 60 shields the downstream supply outlet 62.

In an embodiment, an upstream supply outlet, such as upstream supply outlet 60, that has a low angle of injection (e.g. $\alpha_1$=25.1) will impart significant swirl to the generated film 54 or boundary layer, allowing the coolant streams of the downstream supply outlet 62 to remain undeflected by the freestream of hot gases 52. These coolant streams, shown as film 54 in FIG. 3, continue to wash across the outer surface 34 at a significant angle to the main stream 52 and provide the largest degree of attachment to the outer surface 34 of the substrate 32. This ability to remain attached to the outer surface 34 correlates with an apparent destructive interference of the holes' counter rotating vortex pairs.

Figure 5:
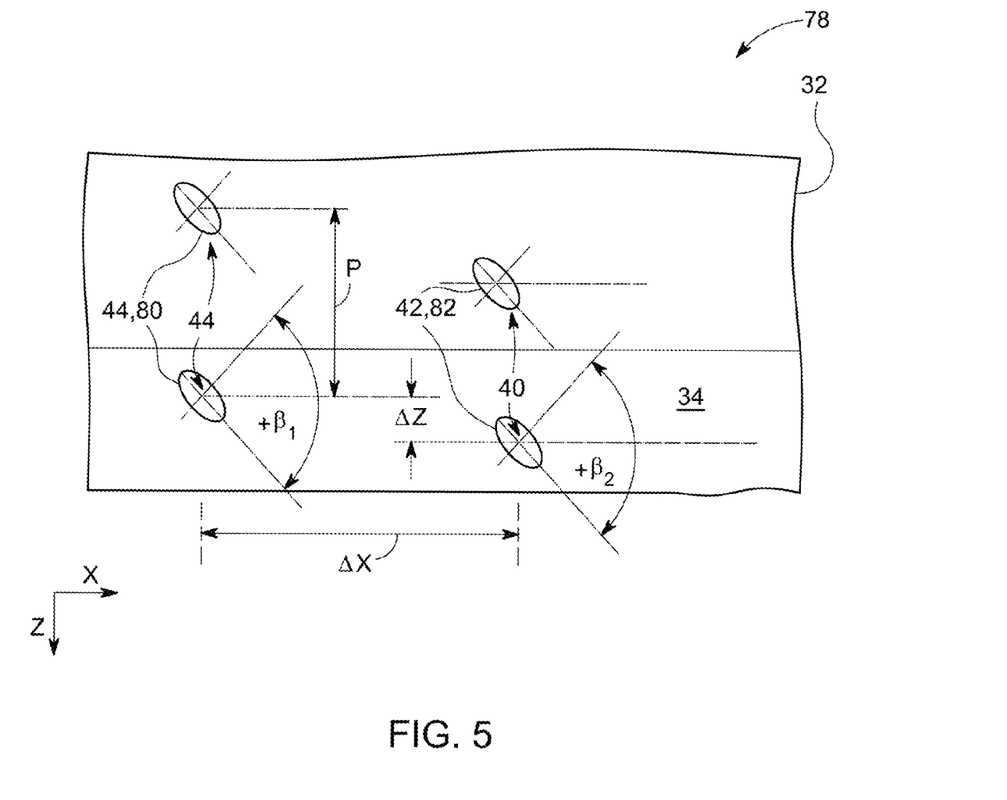
FIG. 5 schematically depicts, in a cross-sectional plan view, example compound cooling features, according to one or more embodiments shown or described herein.
Figure 6:
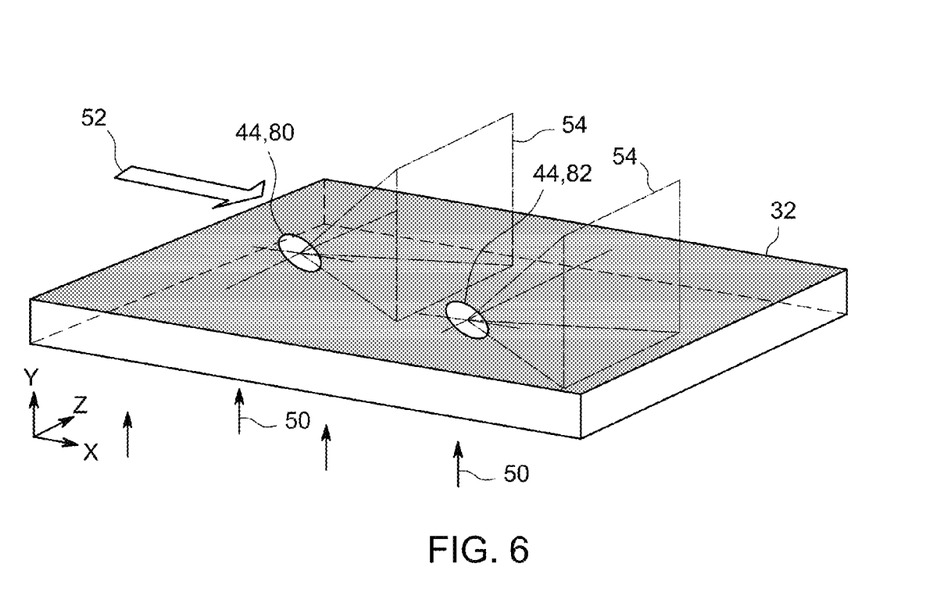
FIG. 6 schematically depicts, in an orthogonal view, example compound cooling features of FIG. 5, according to one or more embodiments shown or described herein.
Figure 7:
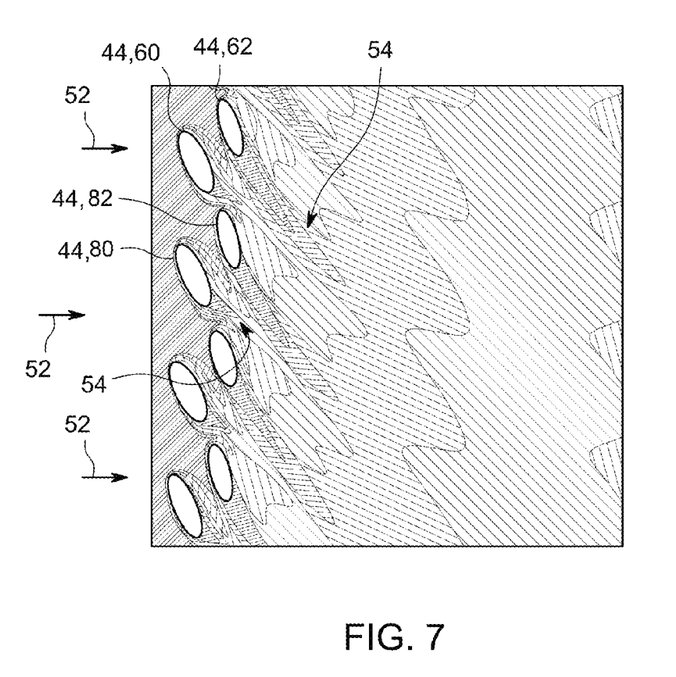
FIG. 7 is a top, thermal schematic view of the hot gas path component of FIGS. 5 and 6, according to one or more embodiments shown or described herein.

Referring now to FIGS. 5-7, illustrated is an embodiment illustrating a portion of a hot gas path component 78, generally similar to hot gas path component 30 previously described. As best illustrated in FIG. 5, the hot gas path component 78 includes a pair of cooling supply outlets 44, and more particularly an upstream supply outlet 80 and a downstream supply outlet 82, configured having complementary compound angles. The incidence angle of the cooling supply outlets 80, 82 with respect to the outer surface 34 of the substrate 32, and more specifically $\alpha_1$ for the upstream supply outlet 80 and $\alpha_2$ for the downstream supply outlet 82, were set independently. The compound transverse angles of the two supply outlets 80, 82 were also set independent from one another with $\beta_1$ being the compound transverse angle of the upstream supply outlet 80 and $\beta_2$ being the compound transverse angle of the downstream supply outlet 82; a positive value for $\beta$ means the cooling supply outlet 80, 82 is oriented towards the right of the domain (positive Z). More particularly, in the illustrated embodiment, the upstream supply outlet 80 is configured wherein $\beta_1$ is approximately 45° and $\beta_2$ is approximately 45°, wherein $\beta_1$ and $\beta_2$ have the same sign, and more specifically, are both positive With compound transverse angles in the 30-45 degree range, the area averaged film effectiveness was significantly increased.

As best illustrated in FIG. 6, the cooling film 54 generated by the cooling flow 50 exiting the upstream cooling supply outlet 80 provides shielding to the downstream cooling supply outlet 82. This shielding of the downstream cooling supply outlet 82 is provided based on the configuration in a similar direction of the compound transverse angles, and thus the cooling supply outlets 80, 82. Shielding of the downstream cooling supply outlet 82 provides the downstream outlet's coolant to remain undeflected by the freestream of hot gases 52. The generated coolant streams continue to wash across the surface 34 of the substrate 32 at a significant angle to the freestream of hot gases 52 and provides an increased degree of attachment to the outer surface 34 of the substrate 32, in contrast to when no shielding is provided, such as when the compound transverse angles have opposite signs. The ability of the film 54, and more specifically the coolant streams, to remain attached to the outer surface 34 correlates with an apparent destructive interference of the outlet's 80, 82 counter rotating vortex pairs.

In studies conducted, the following range of geometric parameters was utilized for the compound angles α and β. In addition, the following geometric parameters were utilized for X, Z and D with regard to outlet spacing.

| Parameter | Low | High |
|---|---|---|
| $\alpha_1$ | 25 | 45 |
| $\alpha_2$ | 25 | 45 |
| $\beta_1$ | −45 | 45 |
| $\beta_2$ | −45 | 45 |
| ΔX/D | 2 | 10 |
| ΔZ/D | 0 | 1.5 |

Illustrated in FIG. 7 is a top, thermal schematic view of the hot gas path component 78. As shown, by configuring the cooling supply outlets 44, such as the upstream supply outlet 80 and the downstream supply outlet 82, in a complementary arrangement, provides the downstream supply outlet 82 to be located in an uncooled region left by the upstream supply outlet 80 leading to increased overall cooling coverage. In addition, counter rotating vortex pairs typically result in lift. By configuring the cooling supply outlets 80, 82 in complementary arrangement as disclosed herein, the counter rotating pairs interact and eliminate one-half of each pair which minimizes mixing and leads to a film 54 that attaches or lays down on the outer surface 34 of the substrate 32. This design is unique in that to provide for this enhanced film 54, the compound angles for the pairs of supply outlets 80, 82 is of the same sign (in the same direction).

Beneficially, the above described hot gas path component with compound angled cooling features utilizes simple geometry and essentially flow control to yield greater film effectiveness. This simple geometry also provides a potential cost benefit in that the outlets and channels are configured substantially as round holes and thus easier and cheaper to manufacture than shaped holes. The disclosed cooling network configuration provides: i) increased film effectiveness by reducing the amount of film cooling required for a hot gas path component, such as a combustor liner or a high pressure turbine; ii) increased specific fuel consumption, by increasing engine efficiency with a reduction in cooling flows, leading to engines that burn less fuel; iii) reduced manufacturing costs in that compound angled holes, such as those utilized for the disclosed supply outlets are easier to manufacture than shaped holes; and iv) less supply outlet blockage, in that shaped holes have been shown to clog in hot and harsh environments and cylindrical/round and compound angled holes are potentially less prone to blockage. Overall the disclosed cooling system, and more particularly the disclosed hot gas path component cooling supply outlet configuration, provides for improved cooling with less flow. The impact of reducing cooling on specific fuel consumption (SFC) varies for each engine, but it has been found that in general a 1% reduction in cooling flow correlates to approximately 0.25% improvement in SFC.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. This written description uses examples to disclose the disclosure, including the best mode, and also to enable any person skilled in the art to practice the disclosure, including making and using any devices or systems and performing any incorporated methods. The representative examples and embodiments provided herein include features that may be combined with one another and with the features of other disclosed embodiments or examples to form additional embodiments that are still within the scope of the present disclosure. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal languages of the claims.

The invention claimed is:

1. A hot gas path component comprising:
a substrate having an outer surface exposed to a stream of hot gases and an inner surface exposed to a cooling flow, the inner surface defining at least one interior space; and
one or more pair of cooling supply inlets formed at the inner surface of the substrate for receiving the cooling air flow, one or more pair of cooling supply outlets formed at the outer surface of the substrate for discharging the cooling air flow, and a cooling flow channel extending through said substrate and between each of the cooling supply inlets and cooling supply outlets for permitting passage of the cooling air flow from the cooling supply inlets to the cooling supply outlets,
wherein each pair of the one or more pair of cooling supply outlets are configured having compound angles $\alpha_1$ and $\alpha_2$ and $\beta_1$ and $\beta_2$, where $\alpha_1$ and $\alpha_2$ are injection angle components of the cooling flow discharged from each pair of the one or more pair of cooling supply outlets measured relative to the outer and inner surfaces of the substrate and $\beta_1$ and $\beta_2$ are compound transverse angle components of the cooling flow discharged from each pair of the one or more pair of cooling supply outlets on a plane along the outer surface and relative to a z-axis aligned relative to the flow direction of the hot gases,
wherein the injection angle components $\alpha_1$ and $\alpha_2$ are of the same sign,
wherein the transverse angle components $\beta_1$ and $\beta_2$ are of the same sign, and
wherein each pair of the one or more pair of cooling supply outlets comprise an upstream cooling supply outlet and a downstream cooling supply outlet and wherein a cooling film generated by the cooling flow exiting the upstream cooling supply outlet shields the downstream cooling supply outlet.

2. The hot gas path component of claim 1, wherein each cooling flow channel extends from the outer surface to the inner surface.

3. The hot gas path component of claim 1, wherein in each pair of the one or more pair of cooling supply outlets each of the upstream cooling supply outlets has a hole diameter D1 and each of the downstream cooling supply outlets has a hole diameter D2 and a streamwise spacing of ΔX and a lateral spacing of ΔZ between the upstream cooling supply outlet and the downstream cooling supply outlet, where a ratio of $\Delta X/D$ is in a range of 2-10 and a ratio of $\Delta Z/D$ is in a range of plus or minus one half the ratio of a pitchwise spacing (P) between the downstream cooling supply outlet of each pair of the one or more pair of cooling supply outlets to an upstream cooling supply outlet of an adjacent pair of cooling supply outlets to the hole diameter D, where D is equal to the larger of D1 and D2 ($\pm\frac{1}{2}$ *P/D), in the presence of two or more pairs of cooling supply outlets and wherein D is equal to the larger of D1 and D2 when D1 and D2 are not equal.

4. The hot gas path component of claim 3, wherein the transverse angle components $\beta_1$ and $\beta_2$ are in a range of $-90°$ to $90°$.

5. The hot gas path component of claim 4, wherein the transverse angle components $\beta_1$ and $\beta_2$ are in a range of $-45°$ to $45°$.

6. The hot gas path component of claim 3, wherein the transverse angle components $\beta_1$ and $\beta_2$ are the same.

7. The hot gas path component of claim 3, wherein the injection angle components $\alpha_1$ and $\alpha_2$ are in a range of $10°$ to $90°$ relative to one of the inner surface or the outer surface.

8. The hot gas path component of claim 7, wherein the injection angle components $\alpha_1$ and $\alpha_2$ are in a range of $25°$ to $45°$ relative to one of the inner surface or the outer surface.

9. The hot gas path component of claim 3, wherein the transverse angle components $\beta_1$ and $\beta_2$ are in a range of $-45°$ to $45°$ and the injection angle components $\alpha_1$ and $\alpha_2$ are in a range of $25°$ to $45°$ relative to one of the inner surface or the outer surface.

10. A wall of a hot gas path component comprising:
opposite inner and outer surfaces having two or more compound angled film cooling holes extending longitudinally therethrough and between two or more cooling supply inlets formed at the inner surface for receiving a cooling flow and two or more cooling supply outlets formed at the outer surface for discharging the cooling flow, each of the two or more cooling supply inlets in fluid communication with one of the two or more cooling supply outlets via a cooling flow channel,
the two or more compound angled film cooling holes configured in pairs having compound angles $\alpha_1$ and $\alpha_2$ and $\beta_1$ and $\beta_2$, where $\alpha_1$ and $\alpha_2$ are injection angle components of the cooling flow discharged from a pair of cooling supply outlets measured relative to the outer and inner surfaces of the wall and $\beta_1$ and $\beta_2$ are compound transverse angle components of the cooling flow discharged from the pair of cooling supply outlets on a plane along the outer surface and relative to a z-axis aligned relative to a flow direction of external hot gases,
wherein the injection angle components $\alpha_1$ and $\alpha_2$ are of the same sign,
wherein the transverse angle components $\beta_1$ and $\beta_2$ are of the same sign, and
wherein each pair of the two or more cooling supply outlets comprise an upstream cooling supply outlet and a downstream cooling supply outlet and wherein a cooling film generated by the cooling flow exiting the upstream supply outlet shields the downstream supply outlet.

11. The wall of the hot gas path component of claim 10, wherein each cooling flow channel extends from the outer surface to the inner surface.

12. The wall of the hot gas path component of claim 10, wherein in each pair of the one or more pair of cooling supply outlets each of the upstream cooling supply outlets has a hole diameter D1 and each of the downstream cooling supply outlets has a hole diameter D2, and a streamwise spacing of $\Delta X$ and a lateral spacing of $\Delta Z$ between the upstream cooling supply outlet and the downstream cooling supply outlet, where a ratio of $\Delta X/D$ is in a range of 2-10 and a ratio of $\Delta Z/D$ is in a range of plus or minus one half the ratio of a pitchwise spacing (P) between the downstream cooling supply outlet of each pair of the one or more pair of cooling supply outlets to an upstream cooling supply outlet of an adjacent pair of cooling supply outlets to the hole diameter D, where D is equal to the larger of D1 and D2 ($\pm\frac{1}{2}$ *P/D), in the presence of two or more pairs of cooling supply outlets and wherein D is equal to the larger of D1 and D2 when D1 and D2 are not equal.

13. The wall of the hot gas path component of claim 10, wherein the transverse angle components $\beta_1$ and $\beta_2$ are directed in the same direction to each other with respect to the flow direction of external hot gases.

14. The wall of the hot gas path component of claim 13, wherein the transverse angle components $\beta_1$ and $\beta_2$ are in a range of $-90°$ to $90°$.

15. The wall of the hot gas path component of claim 14, wherein the injection angle components $\alpha_1$ and $\alpha_2$ are in a range of $10°$ to $90°$ relative to the inner surface.

16. The wall of the hot gas path component of claim 10, wherein each of the cooling supply inlets, the cooling supply outlets and the cooling supply channels is configured having a substantially round geometry.

* * * * *